(12) United States Patent
Coolidge

(10) Patent No.: US 10,281,934 B2
(45) Date of Patent: May 7, 2019

(54) HYDRAULIC CONTROL VALVE WITH CONTROLLED FLOW AND VALVE SAFETY DISABLE

(71) Applicant: Parker-Hannifin Corporation, Cleveland, OH (US)

(72) Inventor: Gregory Thomas Coolidge, Elyria, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 208 days.

(21) Appl. No.: 15/623,618

(22) Filed: Jun. 15, 2017

(65) Prior Publication Data

US 2017/0364102 A1 Dec. 21, 2017

Related U.S. Application Data

(60) Provisional application No. 62/350,788, filed on Jun. 16, 2016.

(51) Int. Cl.
| | |
|---|---|
| *F15B 13/02* | (2006.01) |
| *G05D 16/20* | (2006.01) |
| *F16K 11/07* | (2006.01) |
| *F15B 13/06* | (2006.01) |
| *F15B 13/042* | (2006.01) |
| *F15B 13/00* | (2006.01) |

(52) U.S. Cl.
CPC ......... *G05D 16/2013* (2013.01); *F15B 13/00* (2013.01); *F15B 13/021* (2013.01); *F15B 13/023* (2013.01); *F15B 13/024* (2013.01); *F15B 13/042* (2013.01); *F15B 13/06* (2013.01); *F16K 11/07* (2013.01); *F16K 11/0716* (2013.01)

(58) Field of Classification Search
CPC ........ F15B 13/00; F15B 13/02; F15B 13/021; F15B 13/023; F15B 13/024; F15B 13/025; F15B 13/026; F15B 13/04; F15B 13/0416; F15B 13/0417; F15B 13/042; F15B 13/044; F15B 13/043; F15B 13/0431; F15B 13/0433; F15B 13/0435; F15B 13/06; F16K 11/07; F16K 11/0716
See application file for complete search history.

(56) References Cited

U.S. PATENT DOCUMENTS

2012/0006427 A1* 1/2012 Winfried ............. F15B 13/0402
137/489
2013/0048889 A1* 2/2013 Fujiwara ............... F16K 31/124
251/29
2017/0314577 A1* 11/2017 Mizukami ............. F15B 11/161

* cited by examiner

*Primary Examiner* — Ian G Paquette
(74) *Attorney, Agent, or Firm* — McDonnell Boehnen Hulbert & Berghoff LLP

(57) ABSTRACT

An example valve includes: a valve body defining a bore, an inlet port, an outlet port, and a signal cavity; a spool movable in the bore to shift between a first position and an intermediate position, where the spool has a first end and a second end, where the outlet port is fluidly connected to the second end, where the valve body defines a spring cavity adjacent the first end of the spool to house a spring, where the first end is subjected to a load-sense pressure signal, and where when the spool is in the first position, the spool disconnects the inlet port from the outlet port and connects the inlet port to the signal cavity; and a valve actuator that, when activated, connects the signal cavity to the second end of the spool to move the spool in the bore from the first position to the intermediate position.

20 Claims, 7 Drawing Sheets

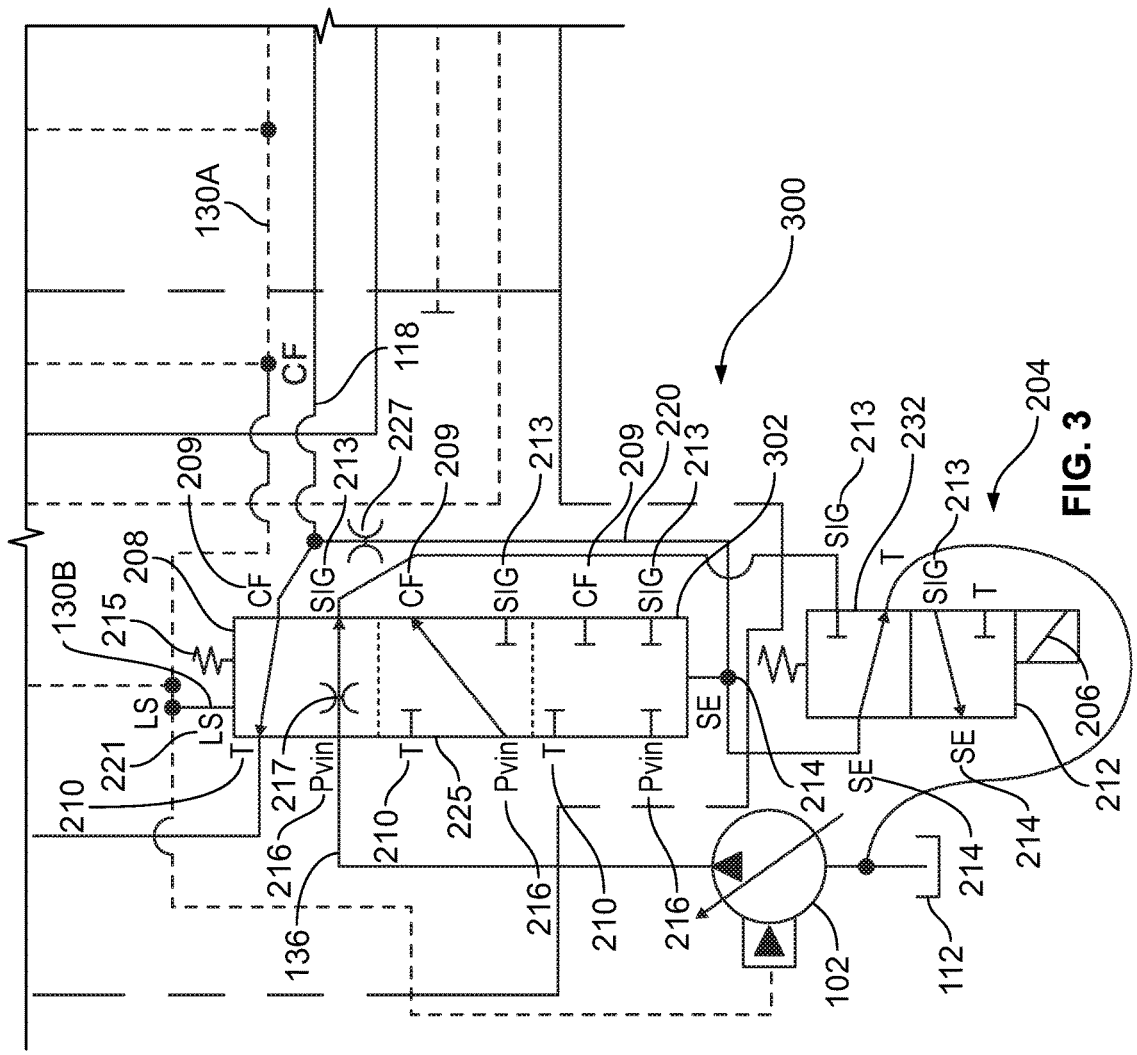

HYDRAULIC CONTROL VALVE WITH CONTROLLED FLOW AND VALVE SAFETY DISABLE

CROSS REFERENCE TO RELATED APPLICATION

The present application claims priority to U.S. Provisional patent application Ser. No. 62/350,788, filed on Jun. 16, 2016, and entitled "Hydraulic Control Valve with Controlled Flow Priority and Valve Safety Disable Scheme," the entire contents of which are herein incorporated by reference as if fully set forth in this description.

BACKGROUND

In certain applications, hydraulic fluid flow in hydraulic machinery may be controlled using hydraulic sectional control valves. A sectional control valve or valve assembly may include a plurality of separate cast and machined metal valve worksections. Each worksection may include internal fluid passages, external ports, and valve bores with valve members slidably disposed within each valve bore. The valve bores may include a main control valve spool bore in which a main directional control valve spool is slidably disposed, and a pressure compensator valve spool bore in which a pressure compensator valve spool is slidably disposed.

In a pressure compensated worksection, the pressure compensator valve spool is arranged to maintain a predetermined pressure drop across a variable orifice of the main control valve spool under normal operating flow conditions independently of the inlet or outlet pressure. By maintaining a substantially constant pressure drop across the variable orifice, a substantially constant flow rate through the variable orifice may be achieved for a given axial position of the main control valve spool.

Pressure compensated worksections may also commonly include load-sense passages. The load-sense passages may be operably connected to provide or transmit a pressure feedback signal from an outlet passage or workport. The pressure feedback signal may be referred to as a load-sense pressure signal and indicates the fluid pressure required by a fluid operated device, such as an actuator, which receives flow from the sectional control valve.

The load-sense passage may further be operably communicated to a load-sensing variable displacement hydraulic pump or other load-sensing source of pressure and flow. The load-sensing source is configured to provide enough flow at the load-sense pressure plus a margin pressure value. This flow is communicated via plumbing to the sectional control valve, where each actuated control section may consume a portion of the flow to drive an associated actuator.

In examples, if the several control sections are actuated at the same time, e.g., the spools in these control sections are moved at the same time, the demanded flow may exceed the flow that the load-sensing source is capable of supplying while maintaining the pressure margin value. As such, the flow reaching the sectional control valve might not have sufficient pressure to properly control the actuators. Further, in some examples, flow demand may suddenly decrease if, for instance, one or more of the actuated spools are returned to their neutral position. If the load-sensing source does not react sufficiently quickly to reduce its flow output, a flow surge may occur. The flow surge may cause undesired motion of the actuators.

It may thus be desirable to have a hydraulic control valve that improves regulation of the pressure and flow of fluid reaching a load-sensing valve from a load-sensing source.

SUMMARY

The present disclosure describes implementations that relate to a hydraulic control valve with controlled flow priority and valve safety disable scheme. In a first example implementation, the present disclosure describes a valve section. The valve section includes: (i) a valve body defining a bore, an inlet cavity configured to receive fluid from a source of fluid, an outlet cavity, and a signal cavity; (ii) a spool axially movable in the bore to shift between a first position, an intermediate position, and a second position, where the spool has a first end and a second end opposite the first end, where the outlet cavity is fluidly connected to the second end, where the valve body defines a spring cavity adjacent the first end of the spool to house a spring configured to bias the spool to the first position, where the first end is subjected to a load-sense pressure signal, and where when the spool is in the first position, the inlet cavity is disconnected from the outlet cavity and the inlet cavity is connected to the signal cavity; and (iii) a valve actuator that, when activated, enables fluid communication between the signal cavity and the second end of the spool through the valve actuator causing the spool to move in the bore from the first position to the intermediate position against forces caused by the spring and the load-sense pressure signal. When the spool reaches the intermediate position, the inlet cavity is disconnected from the signal cavity and the inlet cavity is connected to the outlet cavity, and while the spool is at the intermediate position, an increase in pressure level at the outlet cavity causes the spool to move to the second position at which the inlet cavity is disconnected from the outlet cavity.

In a second example implementation, the present disclosure describes a hydraulic valve assembly. The hydraulic valve assembly includes: (i) a plurality of worksections, each worksection configured to control flow to and from a respective actuator; (ii) a load-sense passage traversing the plurality of worksections and configured to communicate a load-sense pressure signal that represents highest load-induced pressure among respective actuators controlled by the plurality of worksections; and (iii) a valve section mounted adjacent a worksection of the plurality of worksections. The valve section includes: (i) a valve body defining a bore, an inlet port configured to receive fluid from a source of fluid, an outlet port, and a signal cavity; (ii) a spool axially movable in the bore to shift between a first position, an intermediate position, and a second position, where the spool has a first end and a second end opposite the first end, where the outlet port is fluidly connected to the second end, where the valve body defines a spring cavity adjacent the first end of the spool to house a spring configured to bias the spool to the first position, where the first end is fluidly coupled to the load-sense passage and is subjected to the load-sense pressure signal communicated therethrough, and where when the spool is in the first position, the spool disconnects the inlet port from the outlet port and connects the inlet port to the signal cavity; and (iii) a pilot valve that, when activated, enables fluid communication between the signal cavity and the second end of the spool through the pilot valve causing the spool to move in the bore from the first position to the intermediate position against forces caused by the spring and the load-sense pressure signal. When the spool reaches the intermediate position, the spool disconnects the inlet port from the signal cavity and connects the inlet port to the outlet port, and while the spool is at the intermediate position, an increase in pressure level at the outlet port causes the spool to move to the second position at which the spool disconnects the inlet port from the outlet port.

In a third example implementation, the present disclosure describes a valve. The valve includes: (i) a valve body defining a bore, an inlet port configured to receive fluid from a load-sensing source of fluid, an outlet port, a signal cavity, and a load-sense port configured to receive a load-sense pressure signal; (ii) a spool axially movable in the bore to shift between a first position, an intermediate position, and a second position, where the spool has a first end and a second end opposite the first end, where the outlet port is fluidly connected to the second end, where the valve body defines a spring cavity adjacent the first end of the spool to house a spring configured to bias the spool to the first position, where the first end is subjected to the load-sense pressure signal, and where when the spool is in the first position, the spool disconnects the inlet port from the outlet port and connects the inlet port to the signal cavity; and (iii) a valve actuator that, when activated, enables fluid communication between the signal cavity and the second end of the spool through the valve actuator causing the spool to move in the bore from the first position to the intermediate position against forces caused by the spring and the load-sense pressure signal. When the spool reaches the intermediate position, the spool disconnects the inlet port from the signal cavity and connects the inlet port to the outlet port, and while the spool is at the intermediate position, an increase in pressure level at the outlet port causes the spool to move to the second position at which the spool disconnects the inlet port from the outlet port.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 3 illustrates a schematic representation of a two position/three way valve, in accordance with an example implementation.

DETAILED DESCRIPTION

Figure 1A:
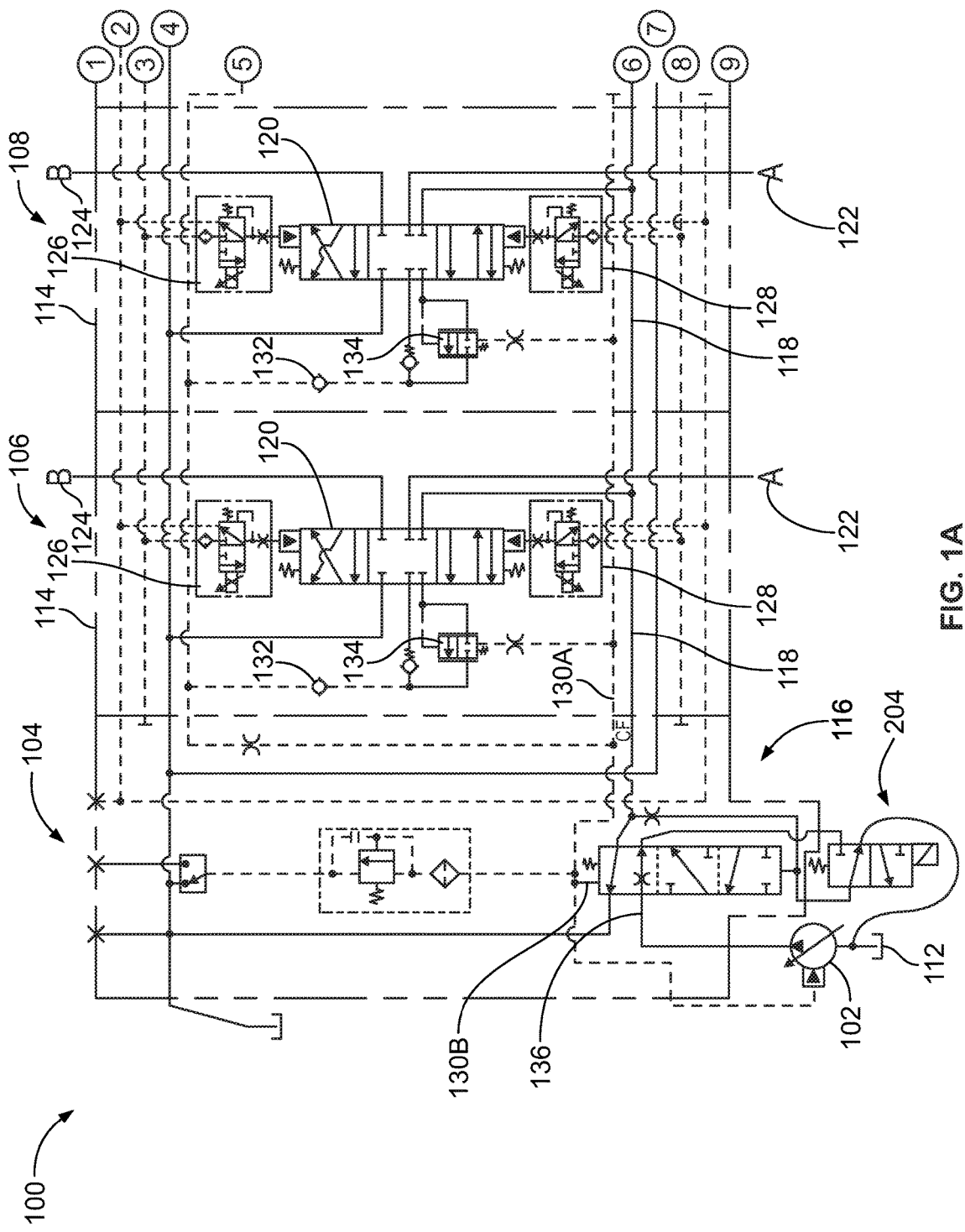
FIG. 1A illustrates a schematic of a hydraulic system, in accordance with an example implementation.

Disclosed herein are systems, valve sections, and valve assemblies that, among other features, enhance regulation of the pressure and flow of fluid reaching a load-sensing valve from a load-sensing source.

In an example, a load-sensing (LS) variable displacement pump may be configured to receive a pump load-sense pressure signal (Ppls) and provide a flow output that has a pressure equal to the Ppls plus a margin pressure setting. In other words, pump output pressure (Ppout) minus Ppls is equal to the margin pressure setting. Particularly, the load-sensing variable displacement pump may be configured to add or subtract output flow to create the margin pressure setting in response to the Ppls pressure.

The load-sensing variable displacement pump may be fluidly coupled to a load-sense control valve. Fluid discharged by the pump may flow through hydraulic lines and associated hydraulic components before reaching the control valve. Flowing through hydraulic lines and associated hydraulic components causes a pressure drop in the pressure of the fluid. Thus, the pressure of the fluid discharged from the pump may be higher than the pressure of the fluid at the inlet of the control valve. The pressure of the fluid at the inlet of the valve may be referred to as (Pvin).

A pressure compensated valve may include a pressure compensator spool that is configured to receive a valve load-sense pressure signal (Pvls) and fluid having a pressure Pvin or a reduced value of Pvin. The pressure compensator spool may then move against the force of a spring or any other biasing device to maintain a predetermined pressure drop across a variable orifice of the main control valve spool.

Because of the pressure drop from the outlet of the pump to the inlet of the valve, Ppout might not be equal to Pvin. Thus, assuming that Ppls is substantially equal to Pvls, then the margin pressure setting (Ppout minus Ppls) might not be equal to (Pvin minus Pvls).

The pressure drop from the outlet of the pump to the inlet of the control valve (Ppout minus Pvin) may vary based on the control valve flow demand, which might be based on the extent of axial movement of the main control valve spools. In examples, the pump might not be capable of achieving a predetermined margin pressure setting (Ppout minus Ppls) when the control valve is actuated in a manner such that flow demands exceeds the maximum flow that the pump can supply at a particular engine rotational speed. This case may be referred to as an over-demand state. In the over-demand state, the difference (Ppout minus Ppls) can drop significantly, and the predetermined margin pressure might thus not be achieved.

Further, if after the over-demand state, control valve flow demand suddenly decreases and the pump does not react fast enough to subtract output flow and reduce Ppout, then the pressure difference (Ppout minus Ppls) may exceed the predetermined margin pressure setting. As a result, because Pvin is based on Ppout, then the pressure difference Pvin-Pvls may also momentarily increase and the pressure compensator valve might not reach fast enough to reduce Pvin-Pvls and maintain the pressure drop across a main control spool. In this case, a control valve flow surge may occur, which might cause undesirable motion of the actuators.

Disclosed below are hydraulic systems, valve sections, and valve assemblies that enhance regulating the pressure differential between an inlet port and a load-sense port in a load-sensing control valve. The disclosed hydraulic systems, valve sections, and valve assemblies seek to maintain the pressure differential between the inlet port and the load-sense port substantially constant to eliminate effects of flow output variation, including flow surges as described above.

Figure 1B:
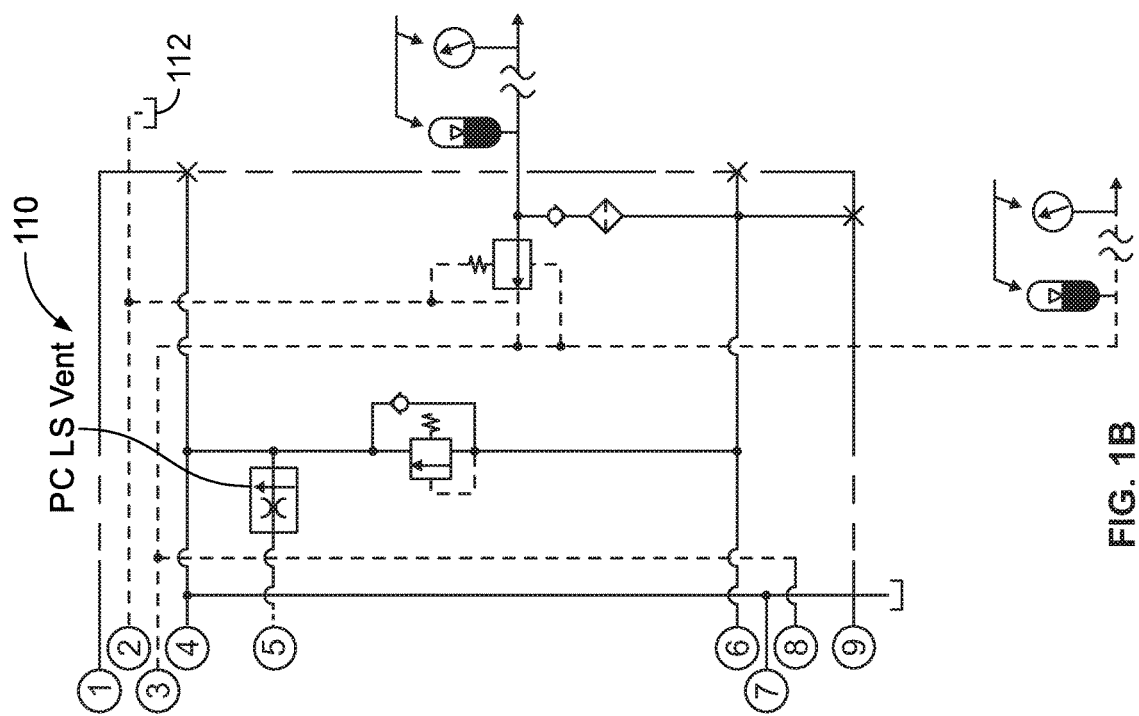
FIG. 1B illustrates a continuation of the schematic of the hydraulic system in FIG. 1A, in accordance with an example implementation.

FIG. 1A illustrates a schematic of a hydraulic system 100, and FIG. 1B illustrates a continuation of the schematic shown in FIG. 1A, in accordance with an example implementation. The hydraulic system 100 includes a pump 102 that operates as a load-sensing (LS) source of hydraulic fluid and pressure. The pump 102 may be, for example, a LS variable displacement pump.

The hydraulic system 100 also includes a valve assembly having an inlet section 104, a first worksection 106, a second worksection 108, and an outlet section 110. The illustrated hydraulic system 100 is provided for illustration purposes, an in other examples, more or fewer worksections could be used.

The valve sections 104, 106, 108, and 110 may be coupled together by fasteners (e.g., bolts screws, clamps, etc.) to provide an assembly of valve sections. For example, the worksections 106 and 108 may be positioned adjacent one another between the inlet section 104 and the outlet section 110 of the valve assembly. As shown in FIG. 1A, the pump 102 may receive fluid from a reservoir or tank 112 to provide pressurized fluid to the valve assembly. The outlet section 110 may receive fluid from any of the inlet section 104, the first worksection 106, and/or the second worksection 108. The outlet section 110 may have a valve assembly tank port that enables the fluid to flow to the tank 112 for later use by the pump 102.

The worksections 106 and 108 may be the same as each other as shown in FIG. 1A, and the same reference numerals are used to refer to the same or similar structures. However, in other examples, one or more of the worksections 106, 108 may be different from one another. As shown in FIG. 1A, each worksection 106 and 108 may have a valve body 114 shown schematically as envelope border in FIG. 1A.

The hydraulic system 100 includes a valve 116 that is configured to regulate flow from the pump 102 to the valve assembly. Operation of the valve 116 is described below. An output flow from the valve 116 may be referred to as controlled flow (CF), and the CF is communicated to the valve assembly through a CF passage 118.

Some hydraulic systems include multiple pumps. For example, in addition to an LS pump such as the pump 102, another non-LS pump could be used to provide flow to other machine actuators. In this example, the LS pump is connected to the valve 116.

Each worksection 106 and 108 further may include a main control valve 120 configured to control fluid flow and pressure from the CF passage 118 to one or more workports 122 (A port) and 124 (B port). Each main control valve 120 may include a respective main control spool. The main control spool can be actuated in either direction via various types of mechanisms. As an example for illustration, solenoid operated pilot valves 126 and 128 could be used to actuate or move the main control spool in a spool bore disposed with the worksection 106, 108. Movement of the main control spool causes fluid to be directed to the workports 122 and 124, which may be fluidly connected to one or more associated hydraulic actuators or fluid receiving devices (e.g., cylinders, motors, etc.).

Movement of a main control spool within a spool bore defines one or more variable area metering orifices that provide a metered flow across the main control spool depending upon the spool position. For example, each of the main control spools may have a plurality of annular grooves or axial notches that cooperate with internal surfaces of the valve body 114 to define a metering orifice. A position of the main control spool may be adjusted with respect to the valve body 114 to variably adjust the area of the metering orifices. Additionally, the main control spools may have flow directional surfaces, such as lands, which direct the fluid flow to the workports 122 or 124 depending on the position of the main control spool.

The valve assembly shown in FIGS. 1A-1B is configured as a load-sensing valve assembly that is configured to provide a load-sense pressure signal through load-sense passage 130A. The load-sense passage 130A traverses the valve assembly and is formed of respective passages within the worksections 106, 108. The pressure feedback signal of the assembly of valve sections is the workport pressure of the worksection 106, 108 that has the highest pressure level in the assembly of valve sections. The highest pressure level is determined or resolved through the use of a load-sense shuttle or check valves 132 shown in FIG. 1A.

Further, each worksection 106 and 108 also includes a pressure compensator valve 134 located downstream from the CF passage 118 and downstream from the main control valve 120. The pressure compensator valve 134 is configured to maintain a predetermined pressure drop across a variable metering orifice formed when the main control spool is moved axially regardless of the load experienced by an associated actuator. The pressure compensator valve 134 is located downstream from the variable metering orifice, and is therefore referred to as a post pressure-compensation (post-comp) flow sharing valve.

The pressure compensator valve 134 may include a valve spool movable in the flow path between the main control valve 120 and the workport 122 or 124 between open and closed positions. The spool of the pressure compensator valve 134 may be subjected to the pressure of fluid received from the main control valve 120 and the highest load pressure (i.e., highest load-sense pressure) of all workports 122, 124 in the valve assembly received through the load-sense passages 130A). As a result of the pressure difference between the highest load pressure and the output pressure of the main control valve 120, the spool of the pressure compensator valve 134 moves against a force of a spring.

With this configuration, the pressure compensator valve 134 changes pressure level of fluid exiting the pressure compensator valve 134 such that the pressure differential across the metering orifice of the main control valve 120 remains substantially constant. This way, the flow across the main control valve 120 is regulated such that a substantially constant flow rate is achieved across the metering orifice for a given position of the main control spool regardless of the load experienced by the actuators.

Further, the valve 116 is configured to regulate flow received from the pump 102 and provide the CF through the CF passage 118 to the worksections 106, 108. Particularly, the valve 116 receives flow having pressure Pvin from the pump via passage 136. Pvin may fluctuate during operation of the pump 102 and the valve assembly due to gradual or sudden changes in the margin pressure setting (Ppout minus Ppls) as previously discussed. The valve 116 generates a "control pressure" (Pcf) in the CF passage 118 such that the pressure difference between Pcf in the CF passage 118 and Pvls in the passages 130 is maintained substantially constant even if there is variation in the pressure difference (Pvin minus Pvls). This way, the pressure compensator valve 134 is shielded from fluctuations of Pvin, and may thus enhance maintaining the pressure differential across the metering orifice of the main control valve 120.

Figure 2A:
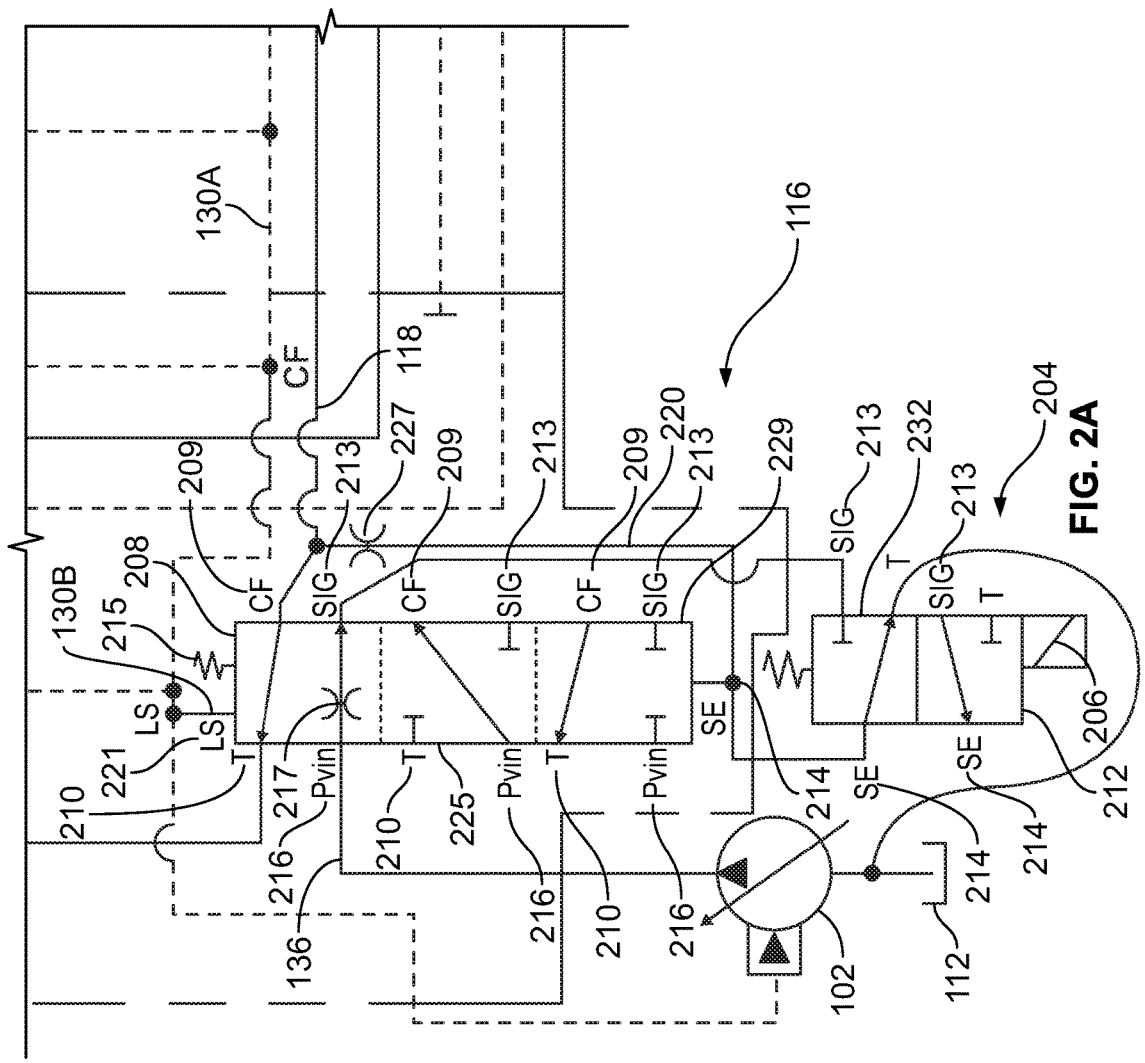
FIG. 2A illustrates a zoomed-in view of a valve from the schematic in FIG. 1A, in accordance with an example implementation.
Figure 2B:
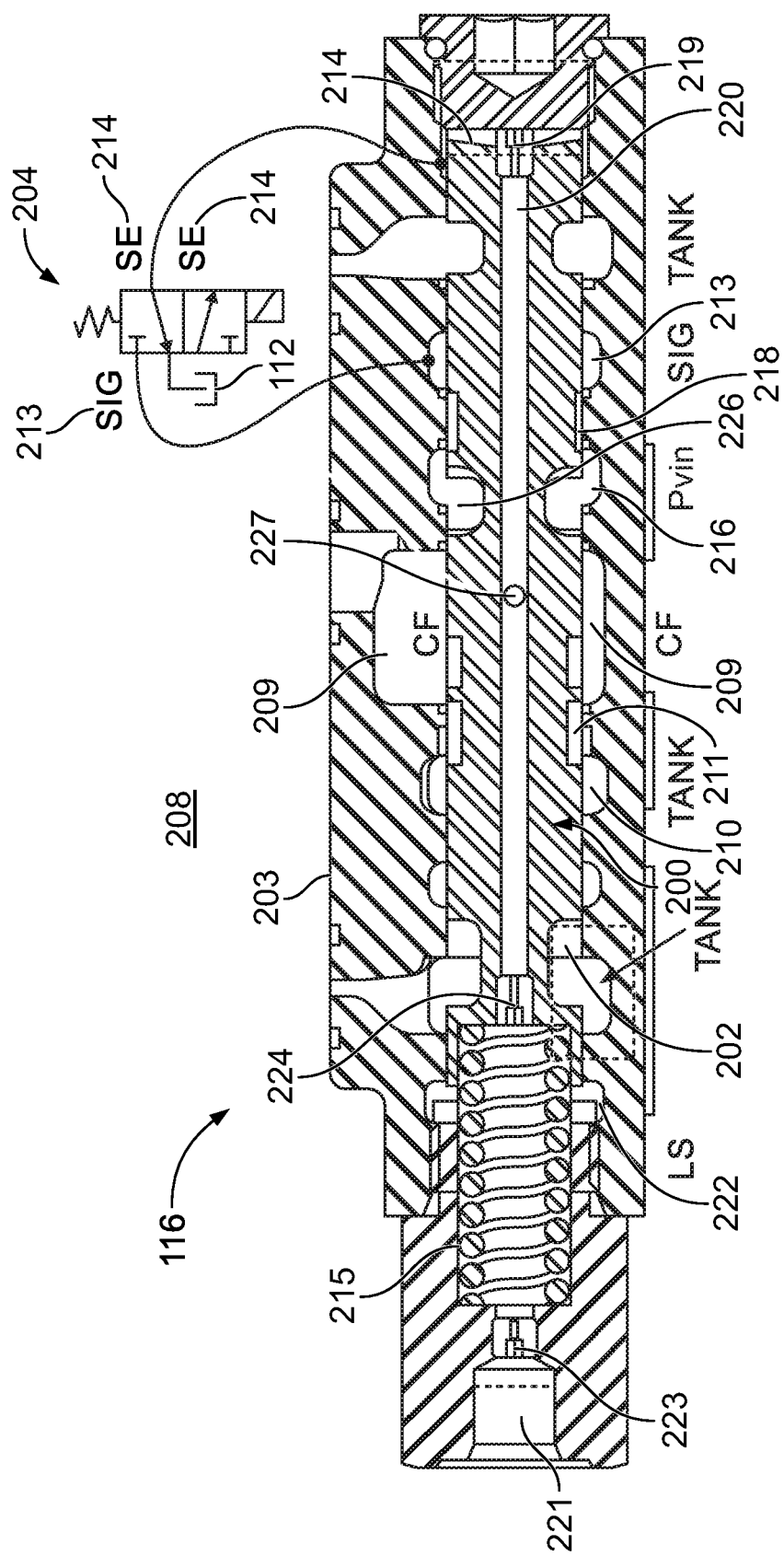
FIG. 2B illustrates a cross section of the valve in FIG. 2A when a control spool is in a first position, in accordance with another example implementation.
Figure 2C:
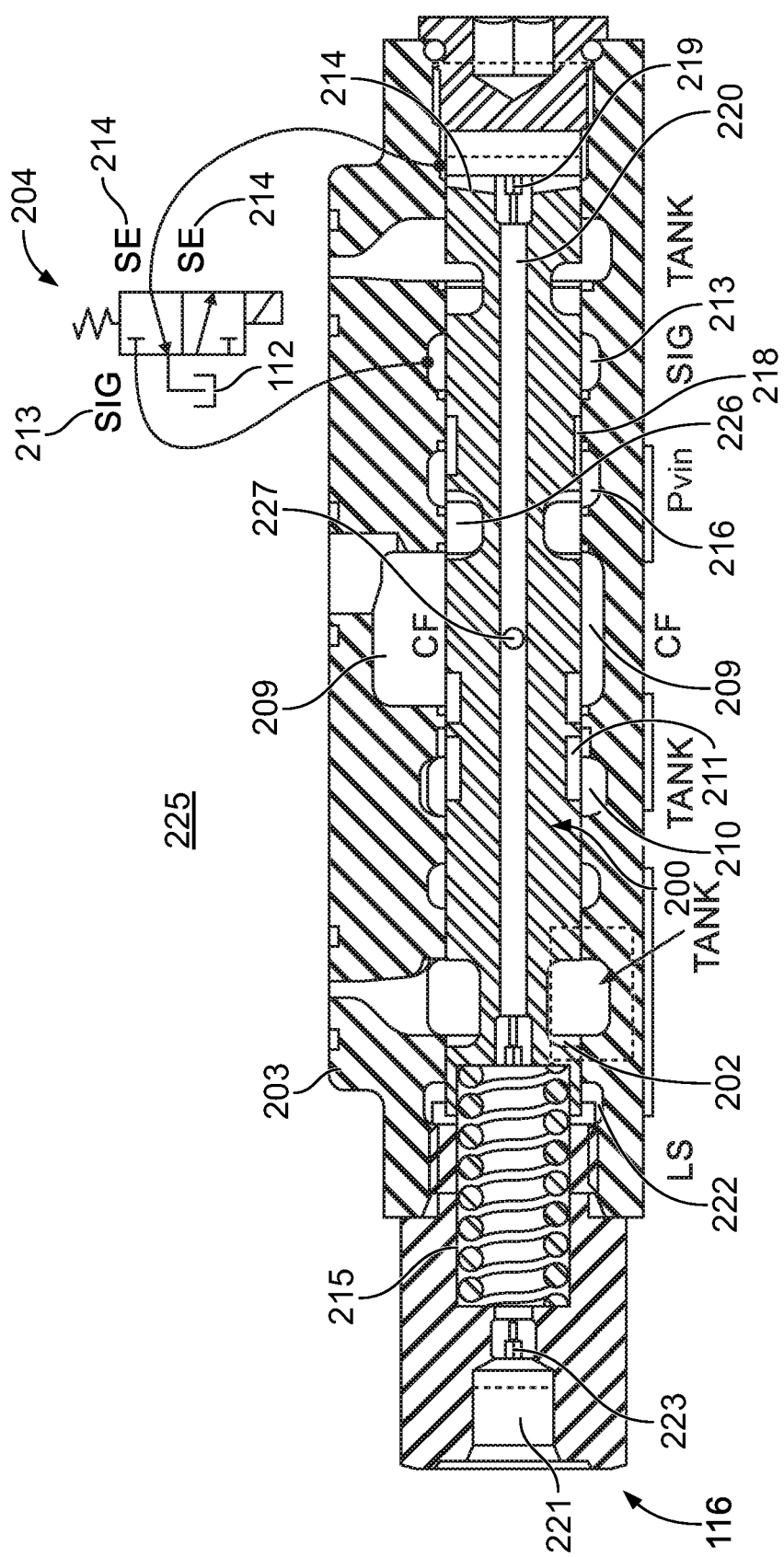
FIG. 2C illustrates a cross section of the valve in FIG. 2A when the control spool is in an intermediate position, in accordance with an example implementation.
Figure 2D:
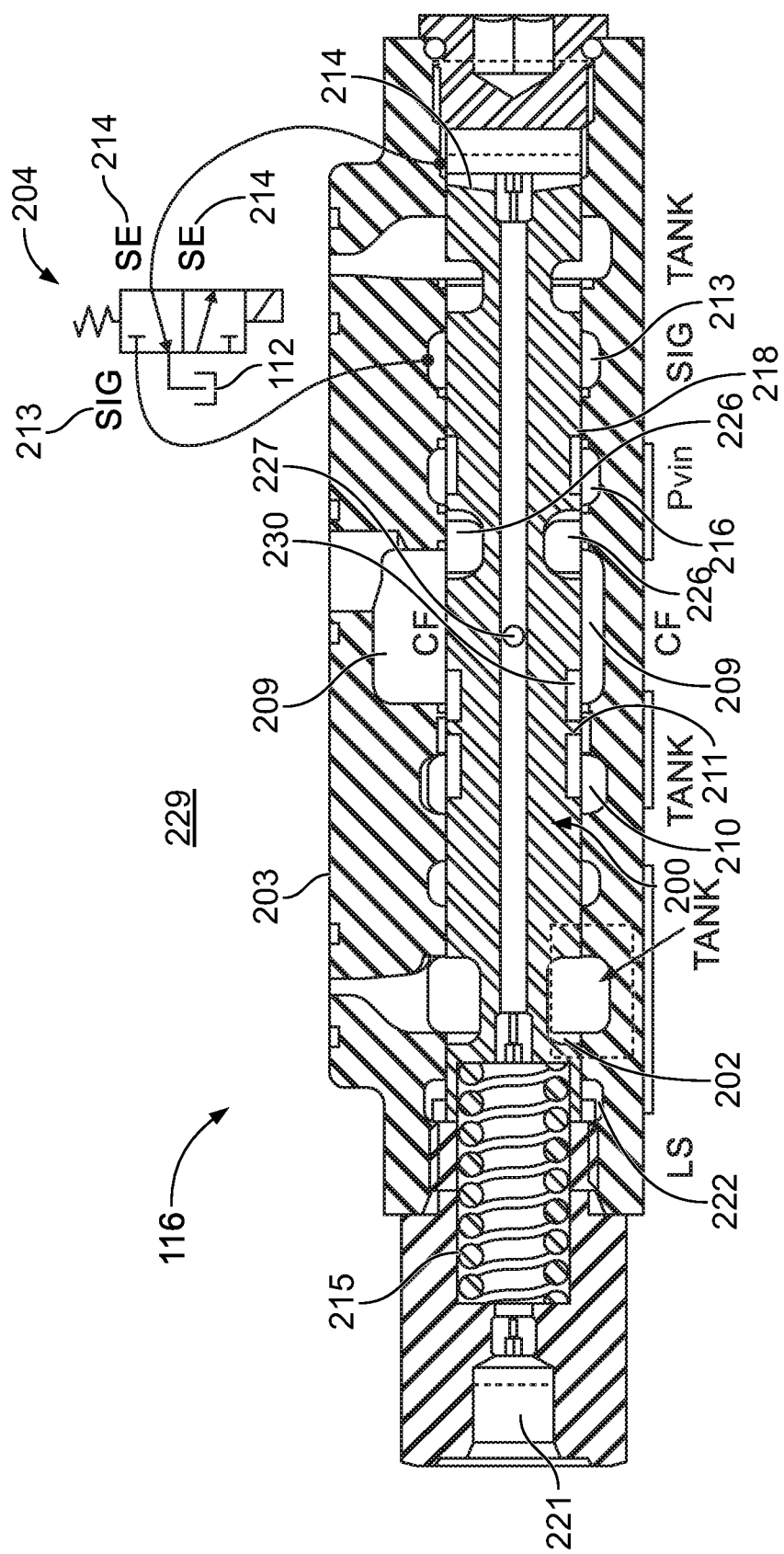
FIG. 2D illustrates a cross section of the valve in FIG. 2A when the control spool is in a second position, in accordance with an example implementation.

FIG. 2A illustrates a zoomed-in view of the valve 116 from the schematic in FIG. 1A, FIG. 2B illustrates a cross section of the valve 116 when a control spool 200 of the valve 116 is in a first position, FIG. 2C illustrates a cross section of the valve 116 when the control spool 200 is in an intermediate position, and FIG. 2D illustrates a cross section of the valve 116 when the control spool 200 is in a second position, in accordance with an example implementation. FIGS. 2A-2D are described together.

The valve 116 may include the control spool 200 that is axially movable in a spool bore 202 of a valve body 203 of the valve 116, as shown in FIG. 2B. A pilot valve 204 is configured as a valve actuator to actuate the control spool 200. For instance, a solenoid 206 may be configured to actuate the pilot valve 204, thus sending a pressure signal to the valve 116 and actuating the control spool 200 as described below.

The valve body 203 includes therein a CF cavity 209 shown as an annular groove defined in the interior peripheral surface of the valve body 203. The CF cavity 209 is connected to a CF port defined on an exterior peripheral surface of the valve body 203. The CF cavity 209 operates an outlet cavity and the CF port operates as an outlet port of the valve 116. The valve body 203 also includes a tank cavity 210 shown as an annular groove defined in the interior peripheral surface of the valve body 203. The tank cavity 210 is connected to a tank or reservoir (e.g., the tank 112 or an external tank) via a tank port defined on an exterior peripheral surface of the valve body 203. When the control spool 200 is in a first position shown in FIG. 2B and schematically depicted in FIG. 2A as state 208, the CF cavity 209 is connected to the tank cavity 210 via an annular groove 211 defined in an exterior peripheral surface of the control spool 200.

The valve body 203 also includes a signal cavity (SIG) 213 shown as an annular groove defined in the interior peripheral surface of the valve body 203. When the pilot valve 204 is actuated to state 212 (FIG. 2A), the SIG 213 is connected through the pilot valve 204 to one end of the control spool 200 referred to herein as spool end 214. In other words, activating the pilot valve 204 enables fluid communication between the SIG 213 and the spool end 214 of the control spool 200 through the pilot valve 204.

The valve body 203 defines a spring cavity adjacent another end of the control spool 200 opposite the spool end 214. A spring 215 is disposed in the spring cavity and acts the end of the control spool 200 that is opposite to the spool end 214. The spring 215 is configured to bias the control spool 200 to the first position at which the spool end 214 abuts an end of the valve body 203 opposite the end containing the spring cavity and the spring 215. A spring is used herein as an example for illustration, and any type of biasing member could be used instead.

Further, the valve body 203 may include a Pvin port that is fluidly coupled to the pump 102 and is configured to receive fluid therefrom through the passage 136. Fluid received at the Pvin port is then communicated to a Pvin cavity 216 shown as an annular groove defined in the interior peripheral surface of the valve body 203. The Pvin cavity 216 operates as an inlet cavity and the Pvin port operates as an inlet port to the valve 116.

When the control spool 200 is in the first position shown in FIG. 2B and schematically depicted in FIG. 2A as the state 208, the Pvin cavity 216 is connected to the SIG 213 via an annular groove 218 defined on the exterior peripheral surface of the control spool 200. Thus, when the pilot valve 204 is deactivated to state 232 shown in FIG. 2A, the fluid received from the pump 102 flows from the Pvin cavity 216 through a restriction 217 to the blocked SIG 213 port. However, when the pilot valve 204 is activated to the state 212, the fluid received from the pump 102 flows from the Pvin cavity 216 through the restriction 217 to the spool end 214 of the control spool 200. The restriction 217 is shown schematically as a restrictive orifice in FIG. 2A. In FIG. 2B, the restriction 217 is created by an overlap of the Pvin cavity 216 with the annular groove 218 and the overlap between the annular groove 218 and the SIG 213.

Further, when the pilot valve 204 is activated to the state 212 shown in FIG. 2A, fluid received at the spool end 214 flows through a fixed orifice 219 disposed in the control spool 200 at the spool end 214, through an inner channel 220 and an orifice 227 in the control spool 200 to the CF cavity 209. The fixed orifice 219 restricts flow therethrough, thus causing pressure to increase at the spool end 214. The pressure increase at the spool end 214 pushes the control spool 200 and causes it to shift (to the left in FIG. 2B).

In example implementations, the valve body 203 defines an LS port 221 that is configured to receive an LS pressure signal (Pvls) through LS passage 130B which is connected to the aforementioned LS passage 130A. The LS pressure signal Pvls is communicated to a load-sense (LS) cavity 222 shown as an annular groove defined in the interior peripheral surface of the valve body 203. In an example, the LS pressure signal Pvls received at the LS port 221 is communicated through an orifice 223 disposed in the valve body 203 to the spring cavity where the spring 215 is disposed. Another orifice 224 is disposed at the end of the control spool 200 opposite the spool end 214 and opposite the orifice 219. The orifices 219, 223, and 224 provide for an improved low temperature operation and improved stability when building pressure. Thus, dynamic performance of the valve 116 is improved. However, in other example implementations, the valve 116 might not include the orifices 219, 223, or 224. For instance, the valve 116 might not include the orifice 224. In other examples, the valve 116 may have a subset of the orifices 219, 223, and 224. In still other examples, the locations of the orifice 223 may change in the valve assembly based on the configuration of the valve assembly. For instance, the valve 116 may have the LS port 221 and the orifice 223 if the LS signal is received from an external valve. If the LS signal is received internally in the valve assembly shown in FIGS. 1A-1B, the valve 116 might not include the LS port 221 and the orifice 223 may be located somewhere else in the valve assembly.

Thus, referring to the implementation of FIG. 2B, when the pilot valve 204 is activated, the pressure communicated from the Pvin cavity 216 through the SIG 213 and the pilot valve 204 to the spool end 214 pushes the control spool 200 against the forces caused by the spring 215 and the LS pressure Pvls. When the pressure of the fluid received through the Pvin cavity 216 overcomes the spring 215 and the LS pressure Pvls, the control spool 200 shifts from the first position to an intermediate position shown in FIG. 2C and depicted schematically in FIG. 2A as state 225. The control spool 200 is continuously movable within the spool bore 202 across infinite intermediate positions before reaching its full stroke position.

At the intermediate position shown in FIG. 2C, the Pvin cavity 216 is fluidly connected to the CF cavity 209 via annular groove 226 defined on the exterior peripheral surface of the control spool 200. Particularly, the annular groove 226 overlaps partially with the Pvin cavity 216 and partially with the CF cavity 209, and thus flow received from the pump at the Pvin cavity 216 is communicated to the CF cavity 209 through the annular groove 226. The CF cavity 209 is fluidly connected to the CF passage 118, and therefore CF fluid is communicated from the CF cavity 209 through the CF passage 118 to the worksections 106, 108.

Also, at the intermediate position of FIG. 2C, the connection between the Pvin cavity 216 and the SIG 213 is blocked. However, referring to FIG. 2A, the CF fluid is communicated to the spool end 214 through the orifice 227 and the internal channel 220, and thus fluid having pressure Pcf (pressure of the CF fluid) continues to actuate or push the control spool 200 against the spring 215 and the LS pressure.

The intermediate position of the control spool 200 is determined by the balance between the LS pressure and the spring 215 on the one hand, and the pressure Pcf of the CF fluid on the other hand. The control spool 200 may continue to shift until the fluid connection between the Pvin cavity 216 and the CF cavity 209 through the annular groove 226 closes or is blocked. At that point, the position of the control spool 200 is modulated to maintain the pressure Pcf by maintaining a connection between the Pvin cavity 216 and the CF cavity 209 through the annular groove 226. Further, the position of the control spool 200 is modulated during the state 225 to maintain the pressure difference (Pcf minus the Pvls at the LS cavity 222) substantially constant and equal to the spring rate of the spring 215 regardless of fluctuations in Pvin at the Pvin cavity 216.

Particularly, during intermediate positions such as the intermediate position of FIG. 2C, fluid flow through the valve 116 is metered based on the degree of overlap of the annular groove 226 with the Pvin cavity 216 and the CF cavity 209. The degree of overlap is based on the axial position of the control spool 200 within the spool bore 202. In this manner, the valve 116 provides for a balance between the LS pressure Pvls and the spring 215 on one hand and the pressure Pcf of the CF in the CF passage 118. This balance determines the proper position of the control spool 200 to provide the requisite CF to the CF passage 118 such that the pressure Pcf in the CF passage 118 minus Pvls is substantially constant. As a result, variations in Pvin are mitigated or filtered out by the valve 116.

In some cases, the pressure Pcf of the CF fluid may increase suddenly or momentarily due to, for example, a sudden increase in the pressure of the fluid received from the pump 102 at the Pvin cavity 216. The increase in the pressure Pcf of the CF fluid to a threshold pressure value may cause the control spool 200 to stroke or shift further and may reach its end of stroke position or second position depicted in FIG. 2D and depicted schematically as state 229 in FIG. 2A.

The threshold pressure value depends on the spring rate of the spring 215. As an example for illustration, if the pressure level at the spool end 214 is about 150 pounds per square inches (psi) or less, the control spool 200 may be disposed in the first position of FIG. 2B. As the pressure level increases, the control spool 200 shifts. If the pressure level increases to about 187 psi, the control spool 200 may reach an intermediate position such as the intermediate position shown in FIG. 2C. The control spool 200 may remain in one of many intermediate positions as the pressure level remains between 187 psi and a threshold pressure value of about 240 psi. If the pressure level exceeds the threshold pressure value of 240 psi, the control spool 200 reaches the second position shown in FIG. 2D. These values are examples for illustration only, and other values or threshold values could be used.

As illustrated in FIGS. 2B-2D, the control spool 200 moves from the first position (FIG. 2B) to the intermediate position (FIG. 2C) in a given axial direction (e.g., to the left in FIG. 2B), and the control spool 200 moves from the intermediate position (FIG. 2C) to the second position (FIG. 2D) in the same axial direction (e.g., to the left in FIG. 2C) such that the intermediate position is spatially between the first position and the second position.

In the second position shown in FIG. 2D, the fluid path from the Pvin cavity 216 to the CF cavity 209 closes or is blocked as the annular groove 226 no longer overlap with the Pvin cavity 216. However, the CF cavity 209 is connected to the tank cavity 210 (which is connected to a tank or reservoir such as the tank 112 or another external tank) via annular groove 230 disposed on the exterior peripheral surface of the control spool 200. Thus, when the pressure of the CF delivered through the CF cavity 209 increases, as soon as the second position is reached, the CF cavity 209 is fluidly connected to a low pressure tank to relieve the pressure (Pcf) of the CF fluid.

This way, the pressure at the CF passage 118 is relieved until the pressure of the CF fluid or the fluid received from the pump 102 at the Pvin cavity 216 is restored to a lower pressure level. When the pressure from the pump 102 and the pressure (Pcf) of the CF fluid in the CF passage 118 are restored to normal operating pressures, the control spool 200 returns to an intermediate position (FIG. 2C) and fluid connection between the Pvin cavity 216 and the CF cavity 209 is restored.

In examples, in addition to regulating the pressure in the CF passage 118, the valve 116 also provides for a safety disable mode. The valve 116 operates in the safety disable mode when the pilot valve 204 is de-energized or deactivated and thus operates in the state 232 shown in FIG. 2A. As described below, while the valve 116 is in the safety disable mode, pressure is unavailable and cannot be generated to move machine actuators controlled by the valve assembly. The safety disable mode is beneficial, for example, when the machine is powered-off but high pressure is trapped in the system or the pump 102 is active, while actuator motion is undesirable. The safety disable mode is also beneficial when the machine is powered-on while the pump 102 is active, which could cause undesirable sudden or jerky actuator movement. Further, the safety disable mode is also beneficial during power loss in the machine or if the valve assembly fails for any reason. In any of these cases, pressure from the pump 102 is not communicated past the valve 116, and therefore any undesirable motion of the actuators is precluded.

To operate the valve 116 in the safety disable mode, the pilot valve 204 is deactivated or de-energized. As a result, as shown by the state 232 in FIG. 2A, the spool end 214 is connected to a low pressure tank (e.g., the tank 112), and thus the control spool 200 is fully de-stroked, and the valve 116 operates in the first position shown in FIG. 2B (the state 208).

As mentioned above, when the control spool 200 is de-stroked to the first position, the CF cavity 209 is connected to the tank cavity 210 and ultimately to a tank or reservoir such as the tank 112. Thus, no pressurized fluid is communicated to the CF passage 118, and the worksections 106, 108 do not receive pressurized fluid. As such, undesirable motion of the actuators controlled by the worksections 106, 108 is precluded.

The valve 116 shown and described in FIGS. 1-2D is an example implementation, and several variations could be made. For example, as shown and described with respect to FIGS. 1-2D, the CF passage 118 is connected internally to post pressure-compensated worksections 106, 108 disposed downstream from the valve 116, while the tank cavity 210 is coupled to an external tank to avoid internal higher pressure tank return in a return line. In another example, while the CF passage 118 is connected internally to the downstream worksections, the tank cavity 210 could be connected internally to a return line connected to the tank 112.

In another example, the CF passage 118 could be connected to an external port in the valve assembly and flow from the CF cavity 209 could be communicated externally to worksections (e.g., the worksections 106, 108) or to a separate LS valve. For example, a separate LS valve that is configured to control other functions of the machine (e.g., steering function) may be coupled to the valve assembly of FIGS. 1A-1B due to space constraints and plumbing configurations. In this example, the valve assembly might not use the CF generated by the valve 116, but rather the CF is communicated from the CF cavity 209 to the LS valve externally (e.g., through external plumbing rather than internal fluid paths drilled in the valve assembly). Also, in this example, the tank cavity 210 may be connected internally to a return line of the LS valve or another non-LS valve fed by another pump. In another example, the CF passage 118 could be connected internally to another LS valve coupled to the valve assembly shown in FIGS. 1A-1B. Thus, the CF cavity 209 and the tank cavity 210 could be plumbed internally or externally.

Also, the valve 116 is shown as integrated into the inlet section 104. In some examples, the valve 116 may be included in the outlet section 110 or an intermediate worksection. In other examples, the valve 116 may be included in a separate valve section that is coupled or mounted adjacent to the inlet section 104, the outlet section 110 or any of the intermediate worksections 106, 108. In this manner, the functionality of the valve 116 may be added to an existing valve assembly by adding an extra valve section that includes or houses the components of the valve 116.

Further, although the valve 116 is shown as a two position/four way valve, in other example implementation, a two position/three way valve could be used. FIG. 3 illustrates a schematic representation of a two position/three way valve 300, in accordance with an example implementation. The valve 300 is similar to the valve 116 and therefore the same reference numbers are used to refer to similar components of both valves.

A difference between the valve 300 and the valve 116 involves fluid connections at the full stroke or second position. As mentioned above, when the control spool 200 of the valve 116 is fully stroked to the second position represented by the state 229 in FIG. 2D, the CF is communicated from the CF cavity 209 to the tank cavity 210. The valve 300 has an alternative state 302 represented schematically in FIG. 3.

As depicted schematically in FIG. 3, when a control spool of the valve 300 is fully stroked and is in the state 302, the CF fluid is blocked from flowing from the CF cavity 209 to the tank cavity 210, and is thus blocked from flowing to a tank or reservoir. With this configuration, the valve 300 provides for a CF having a stable pressure when its control spool is in the state 225, but might not relieve the CF pressure (Pcf) of the CF fluid when the control spool is fully stroked (e.g., the state 302). For example, the control spool of the valve 300 might not have the annular groove 230 of the control spool 200 of the valve 116, and therefore no fluid connection is established between the CF cavity 209 and the tank cavity 210 when the control spool is fully stroked (the state 302).

As mentioned above with respect to the valve 116, the CF passage 118 connected to the CF cavity or port of the valve 300 could be connected internally to post pressure-compensated worksections 106, 108 disposed downstream from the valve 300. In another example, however, the CF passage 118 could be connected to an external port in the valve assembly and flow from the CF cavity 209 could be communicated externally to worksections (e.g., the worksections 106, 108) or to a separate LS valve. For example, a separate LS valve that is configured to control other functions of the machine (e.g., steering function) may be coupled to the valve assembly of FIGS. 1A-1B due to space constraints and plumbing configurations. In this example, the valve assembly of FIGS. 1A-1B might not use the CF generated by the valve 300, but rather the CF is communicated from the CF cavity 209 to the LS valve externally (e.g., through external plumbing rather than internal fluid paths drilled in the valve assembly). Thus, the CF cavity 209 could be plumbed internally or externally.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve section comprising:
a valve body defining: a bore, an inlet cavity configured to receive fluid from a source of fluid, an outlet cavity, and a signal cavity;
a spool axially movable in the bore to shift between a first position, an intermediate position, and a second position, wherein the spool has a first end and a second end opposite the first end, wherein the outlet cavity is fluidly connected to the second end, wherein the valve body defines a spring cavity adjacent the first end of the spool to house a spring configured to bias the spool to the first position, wherein the first end is subjected to a load-sense pressure signal, and wherein when the spool is in the first position, the inlet cavity is disconnected from the outlet cavity and the inlet cavity is connected to the signal cavity; and
a valve actuator that, when activated, enables fluid communication between the signal cavity and the second end of the spool through the valve actuator causing the spool to move in the bore from the first position to the intermediate position against forces caused by the spring and the load-sense pressure signal, wherein:
when the spool reaches the intermediate position, the inlet cavity is disconnected from the signal cavity and the inlet cavity is connected to the outlet cavity, and
while the spool is at the intermediate position, an increase in pressure level at the outlet cavity causes the spool to move to the second position at which the inlet cavity is disconnected from the outlet cavity.

2. The valve section of claim 1, wherein when the valve actuator is deactivated, the signal cavity is disconnected from the second end of the spool and the second end of the spool is connected to the low pressure tank to maintain the spool in the first position where the inlet cavity is disconnected from the outlet cavity.

3. The valve section of claim 1, wherein the spool further comprises a fixed orifice at the second end of the spool, wherein the fixed orifice is disposed in a fluid path between the signal cavity and an internal channel of the spool when the valve actuator is activated, and wherein the fixed orifice allows a respective pressure level at the second end of the spool to increase.

4. The valve section of claim 1, wherein when the spool is in the second position, the outlet cavity is connected to a tank cavity configured to be coupled to a low pressure tank.

5. The valve section of claim 1, wherein when the spool is in the second position, the outlet cavity is blocked.

6. The valve section of claim 1, wherein the spool moves from the first position to the intermediate position in a given axial direction, and wherein the spool moves from the intermediate position to the second position in the given axial direction such that the intermediate position is between the first position and the second position.

7. The valve section of claim 1, wherein the spool moves to the second position when the pressure level at the outlet cavity increases to a threshold pressure value, and wherein when the pressure level is decreased below the threshold pressure level, the spool returns to the intermediate position and the inlet cavity is reconnected to the outlet cavity.

8. The valve section of claim 1, wherein the valve section is mounted to a plurality of worksections of a hydraulic valve, each worksection configured to control flow to and from a respective actuator, and wherein the load-sense pressure signal represents highest load-induced pressure among respective actuators controlled by the plurality of worksections.

9. The valve section of claim 8, wherein the outlet cavity of the valve section is fluidly coupled through internal paths in the valve section and the hydraulic valve to respective inlets of the plurality of worksections.

10. The valve section of claim 8, wherein the hydraulic valve is a first valve, and wherein the outlet cavity of the valve section is fluidly coupled externally to a second hydraulic valve.

11. The valve section of claim 8, wherein the valve body further defines a load-sense port configured to receive the load-sense pressure signal, wherein the load-sense port is fluidly coupled to a load-sense cavity configured to communicate the load-sense pressure signal through an orifice to the first end of the spool.

12. A hydraulic valve assembly comprising:
plurality of worksections, each worksection configured to control flow to and from a respective actuator;
a load-sense passage traversing the plurality of worksections and configured to communicate a load-sense pressure signal that represents highest load-induced pressure among respective actuators controlled by the plurality of worksections; and
a valve section mounted adjacent a worksection of the plurality of worksections, wherein the valve section comprises:
a valve body defining: a bore, an inlet port configured to receive fluid from a source of fluid, an outlet port, and a signal cavity,
a spool axially movable in the bore to shift between a first position, an intermediate position, and a second position, wherein the spool has a first end and a second end opposite the first end, wherein the outlet port is fluidly connected to the second end, wherein the valve body defines a spring cavity adjacent the first end of the spool to house a spring configured to bias the spool to the first position, wherein the first end is fluidly coupled to the load-sense passage and is subjected to the load-sense pressure signal communicated therethrough, and wherein when the spool is in the first position, the spool disconnects the inlet port from the outlet port and connects the inlet port to the signal cavity, and
a pilot valve that, when activated, enables fluid communication between the signal cavity and the second end of the spool through the pilot valve causing the spool to move in the bore from the first position to the intermediate position against forces caused by the spring and the load-sense pressure signal, wherein when the spool reaches the intermediate position, the spool disconnects the inlet port from the signal cavity and connects the inlet port to the outlet port, and wherein while the spool is at the intermediate position, an increase in pressure level at the outlet port causes the spool to move to the second position at which the spool disconnects the inlet port from the outlet port.

13. The hydraulic valve assembly of claim 12, wherein the outlet port of the valve section is fluidly connected to respective inlets of the plurality of worksections.

14. The hydraulic valve assembly of claim 12, wherein the outlet port is fluidly connected externally through a port in the valve section to another load-sense valve assembly.

15. The hydraulic valve assembly of claim 12, wherein each worksection further comprises a pressure compensator valve located downstream from the outlet port of the valve section and downstream from a variable metering orifice formed by a main control spool axially movable within the worksection to regulate flow from the outlet port to the variable metering orifice.

16. The hydraulic valve assembly of claim 12, wherein when the pilot valve is deactivated, the pilot valve disconnects the signal cavity from the second end of the spool and connects the second end of the spool to the low pressure tank to maintain the spool in the first position where the spool disconnects the inlet port from the outlet port.

17. A valve comprising:
   a valve body defining: a bore, an inlet port configured to receive fluid from a load-sensing source of fluid, an outlet port, a signal cavity, and a load-sense port configured to receive a load-sense pressure signal;
   a spool axially movable in the bore to shift between a first position, an intermediate position, and a second position, wherein the spool has a first end and a second end opposite the first end, wherein the outlet port is fluidly connected to the second end, wherein the valve body defines a spring cavity adjacent the first end of the spool to house a spring configured to bias the spool to the first position, wherein the first end is subjected to the load-sense pressure signal, and wherein when the spool is in the first position, the spool disconnects the inlet port from the outlet port and connects the inlet port to the signal cavity; and
   a valve actuator that, when activated, enables fluid communication between the signal cavity and the second end of the spool through the valve actuator causing the spool to move in the bore from the first position to the intermediate position against forces caused by the spring and the load-sense pressure signal, wherein when the spool reaches the intermediate position, the spool disconnects the inlet port from the signal cavity and connects the inlet port to the outlet port, and wherein while the spool is at the intermediate position, an increase in pressure level at the outlet port causes the spool to move to the second position at which the spool disconnects the inlet port from the outlet port.

18. The valve of claim 17, wherein when the valve actuator is deactivated, the signal cavity is disconnected from the second end of the spool and the second end of the spool is connected to the low pressure tank to maintain the spool in the first position where the spool disconnects the inlet port from the outlet port.

19. The valve of claim 17, wherein when the spool is in the second position, the spool connects the outlet port to a tank port configured to be coupled to a low pressure tank.

20. The valve of claim 17, wherein when the spool is in the second position, the spool blocks flow to the outlet port.

* * * * *